(12) United States Patent
Hirata et al.

(10) Patent No.: US 8,000,027 B2
(45) Date of Patent: Aug. 16, 2011

(54) DRIVE DEVICE, LENS BARREL, IMAGE PICKUP APPARATUS, LENS DRIVE METHOD AND METHOD OF PRODUCING SHAPE MEMORY ALLOY

(75) Inventors: Saori Hirata, Hino (JP); Katsumi Ohtsuka, Hachioji (JP); Chie Nemoto, Tachikawa (JP); Kenpo Tsuchiya, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 486 days.

(21) Appl. No.: 11/990,253

(22) PCT Filed: Aug. 2, 2006

(86) PCT No.: PCT/JP2006/315261
§ 371 (c)(1),
(2), (4) Date: Feb. 7, 2008

(87) PCT Pub. No.: WO2007/018086
PCT Pub. Date: Feb. 15, 2007

(65) Prior Publication Data
US 2011/0096421 A1    Apr. 28, 2011

(30) Foreign Application Priority Data

Aug. 11, 2005 (JP) .................... 2005-232920
Aug. 22, 2005 (JP) .................... 2005-239758
Sep. 13, 2005 (JP) .................... 2005-265023

(51) Int. Cl.
*G02B 15/14* (2006.01)
*G02B 7/02* (2006.01)

(52) U.S. Cl. ......... 359/694; 359/822; 359/823; 359/824
(58) Field of Classification Search ............... 359/811, 359/819, 822–824
See application file for complete search history.

(56) References Cited

U.S. PATENT DOCUMENTS

| 5,459,544 | A | * | 10/1995 | Emura ........................ 396/257 |
| 5,624,508 | A | * | 4/1997 | Flomenblit et al. .......... 148/510 |
| 5,836,066 | A | * | 11/1998 | Ingram ......................... 29/90.7 |
| 6,804,068 | B2 | * | 10/2004 | Sasaki et al. .................. 359/811 |
| 2002/0112788 | A1 | * | 8/2002 | Tanaka et al. ................. 148/402 |

(Continued)

FOREIGN PATENT DOCUMENTS

JP            7-233432            9/1995

(Continued)

*Primary Examiner* — Jessica T Stultz
*Assistant Examiner* — Mahidere S Sahle
(74) *Attorney, Agent, or Firm* — Cohen Pontani Lieberman & Pavane LLP

(57) ABSTRACT

A lens barrel, an image pickup apparatus, a lens drive method and a method of producing a shape memory alloy used for the drive device are disclosed. A drive device includes: a lens group for guiding light from a subject; a shape memory alloy adopted to be deformed by an electricity supplied to the shape memory alloy, for moving the lens group in a direction of an optical axis; and electricity-supply controlling means for controlling an amount of the electricity supplied to the shape memory alloy; and a detecting means for detecting whether a movement of the lens group starts or not. In the drive device, a movement amount of the lens group in the direction of the optical axis is controlled based on the amount of electricity supplied when the detecting means detects the movement of the lens group.

13 Claims, 13 Drawing Sheets

U.S. PATENT DOCUMENTS

2005/0207896 A1 * 9/2005 Gigliotti et al. .......... 416/241 R

FOREIGN PATENT DOCUMENTS

| JP | 8-269654 | 10/1996 |
| JP | 10-307628 | 11/1998 |
| JP | 11-324896 | 11/1999 |
| JP | 2001-263221 | 9/2001 |
| JP | 2002-099019 | 4/2002 |
| JP | 2002-296633 | 10/2002 |
| WO | WO 2004/099611 | 11/2004 |

* cited by examiner

DRIVE DEVICE, LENS BARREL, IMAGE PICKUP APPARATUS, LENS DRIVE METHOD AND METHOD OF PRODUCING SHAPE MEMORY ALLOY

RELATED APPLICATIONS

This is a U.S. National Phase Application under 35 USC 371 of International Application PCT/JP2006/315261 filed on Aug. 2, 2006.

This application claims the priority of Japanese application nos. 2005-232920 filed Aug. 11, 2005, 2005-239758 filed Aug. 22, 2005 and 2005-265023 filed Sep. 13, 2005, the entire content of all of which is hereby incorporated by reference.

TECHNICAL FIELD

The present invention relates to a drive device constructed to move a lens group representing a driven body by using expansion and contraction of a shape memory alloy, a lens barrel, an image pickup apparatus, a lens drive method and a method of producing a shape memory alloy used for the drive device.

BACKGROUND ART

With regard to the shape memory alloy (hereinafter referred to sometimes as "SMA"), even if it is plastically deformed due to receiving force in a temperature not higher than martensitic transformation completion temperature, it recovers its shape when it is heated to the temperature that is not less than reverse transformation completion temperature.

FIG. 23 is a diagram wherein a relation between temperature and deformation of the shape memory alloy is graphed schematically. In FIG. 23, the horizontal axis represents temperature (° C.) and the vertical axis represents deformation (%).

As shown in FIG. 23, when electricity is supplied between both ends of the shape memory alloy at a low temperature, the shape memory alloy is contracted by generated heat to return to its memorized length. On the other hand, when the electricity supply stops at the state of this high temperature, the temperature of the shape memory alloy decreases due to heat radiation, and its length changes with hysteresis to become the state of elongated again. The shape memory alloy is possible to use as an actuator by utilizing this effect of shape memory, and there have been made various proposals.

However, actions of a shape memory alloy (SMA) are provided by heating SMA with Joule heat through supplying electricity for SMA, and thereby obtaining displacement of a driven member by utilizing a deformation corresponding to the temperature resulted from the heating. Therefore, it has been difficult to determine the unique input condition for SMA to obtain desired displacement, because of various un-uniformity in the constituted system such as, for example, errors in a length of SMA, errors in a resistance value of SMA, errors of mechanical dimensions of constituent members and the ambient temperature.

For dissolving the aforesaid problems, therefore, there has been proposed a position-control drive device that detects a position of a lens group representing a driven body, and partially changes the shape memory alloy based on the results of the detection (for example, see Patent Document 1 Japanese Patent Publication Open to Public Inspection No. 10-307628)

Further, Japanese Patent Publication Open to Public Inspection (JP-A) No. 11-324896 discloses a drive mechanism that detects the ambient temperature with a temperature sensor, and controls a current value and a voltage value to be supplied to a wire formed by a shape memory alloy, or controls a duty ratio of a pulse current or of a pulse voltage to be supplied to the wire, based on the detected result.

Further, JP-A No. 2002-99019 discloses a drive mechanism using a string-like shape memory alloy which is formed to be in a doglegged shape to be in contact with a driven body at the substantial center position of the string-like shape memory alloy and to be fixed at both ends of the string-like shape memory alloy.

DISCLOSURE OF THE INVENTION

Problems to be Solved by the Invention

The position control drive device in the aforesaid JP-A No. 10-307628 is suitable to drive a lens group with being arranged in a lens barrel of a device such as a camera. However, when it is applied to a lens drive device of a small-sized and thin image pickup apparatus provided to be housed in, for example, a mobile terminal, there are needed position detecting sensors for acquiring information about the present position of a driven member to be arranged on the total area where the driven member moves, resulting in slight disadvantage for downsizing and cost reduction, which is a problem.

In the drive mechanism described in the aforesaid JP-A No. 11-324896, it is suitable to be utilized at the inside of the apparatus where temperature distribution is relatively uniform such as a rear cover of a camera. However, when it is applied to a lens drive device of a small-sized and thin image pickup apparatus provided to be housed in, for example, a mobile terminal, circuit parts that operate other functions are arranged densely in the vicinity of the drive mechanism, whereby, temperature distribution in the apparatus is not uniform, and detection values vary depending on a position where a temperature sensor is arranged. Thus, it is sometimes provide a situation hardly to conduct optimum control.

Further, the drive mechanism described in JP-A No. 2002-99019 wherein a string-like shape memory alloy which is formed to be in a doglegged shape is used, is not so problematic for mounting in a large equipment such as binocular glasses. However, it requires any other ideas for applying the drive mechanism to a small-sized image pickup apparatus to mount it in a mobile terminal, because fixed sections on both ends are protruded greatly from both sides of a driven body.

It is known that the shape memory alloy occurs an initial creep phenomenon that a deformation amount changes depending on the number of times of supplying electricity at the initial step where the frequency of supplying electricity is small. When a drive device utilizing a shape memory alloy controls a position of a driven body, the deformation amount changes unwillingly even when applying the same amount of current, because of the aforesaid initial creep phenomenon. Therefore, there is also in a problem that accurate position control is difficult.

In view of the aforesaid problems, an object of the invention is to obtain a small-sized and low-cost drive device that employs a shape memory alloy for an actuator, and can stop a lens group at a desired position and is suitable to be mounted in a mobile terminal; a lens barrel; an image pickup apparatus; a lens drive method; and a method of producing a shape memory alloy used for the drive device.

Means to Solve the Problems

The aforesaid problems are solved by the structures listed below:

1. A drive device comprising: a lens group for guiding light from a subject; a shape memory alloy adopted to be deformed by an electricity supplied to the shape memory alloy, for moving the lens group in a direction of an optical axis; an electricity-supply controlling means for controlling an amount of the electricity supplied to the shape memory alloy; and a detecting means for detecting whether a movement of the lens group starts or not, wherein a movement amount of the lens group in the direction of the optical axis is controlled based on the amount of the electricity supplied when the detecting means detects the movement of the lens group.

2. A drive device comprising: a lens group for guiding light from a subject; a shape memory alloy adopted to be deformed by an electricity supplied to the shape memory alloy, for moving the lens group in a direction of an optical axis; an electricity-supply controlling means for controlling an amount of the electricity supplied to the shape memory alloy; and a detecting means for detecting a movement of the lens group at the two predetermined positions, wherein a movement amount of the lens group in the direction of the optical axis is controlled based on each of amounts of the electricity supplied when the detecting means detects the movement of the lens group between two predetermined positions along the optical axis.

3. The drive apparatus of Item 1 or 2, wherein the detecting means is an output of an image pickup element.

4. A drive device comprising: a driven body; a shape memory alloy engaged with the driven body; a heating section for heating the shape memory alloy; a controlling section for controlling a drive of the driven body by controlling the heating section, wherein the controlling section applies an aging treatment to the shape memory alloy when the shape memory alloy is initially used, the aging treatment controlling the heating section to repeat a predetermined number or more of times of heating and no-heating processes.

5. The drive device of Item 4, wherein the heating section heats the shape memory alloy by applying an electric current to the shape memory alloy.

6. A drive device comprising: a driven body; a shape memory alloy engaged with the driven body; a heating section for heating the shape memory alloy; a controlling section for controlling a drive of the driven body by controlling the heating section, wherein the shape memory alloy is applied an aging treatment in advance, the aging treatment repeating a predetermined number or more of times of heating and no-heating processes.

7. The drive device of Item 6, wherein the shape memory alloy is heated by applying an electric current to the shape memory alloy.

8. A lens barrel comprising: a lens group for guiding light from a subject; a lens frame supporting the lens group; and a shape memory alloy formed in a shape of a string for moving the lens frame in a predetermined direction, wherein a part of the shape memory alloy is arranged in an optical path of the lens group, and the shape memory alloy moves the lens frame by being contracted due to an electricity supplied to the shape memory alloy.

9. The lens barrel of Item 8, wherein the shape memory alloy moves the lens frame in a direction of an optical axis by being contracted.

10. The lens barrel of Item 9, wherein the shape memory alloy moves the lens frame close to the subject by being contracted.

11. The lens barrel of Item 10, wherein the lens frame is pressed toward an image-forming surface.

12. An image pickup apparatus comprising the drive apparatus of any one of Items 1 to 7.

13. An image pickup apparatus comprising the lens barrel of any one of Items 8 to 11.

14. A lens drive method of driving a lens group for controlling an amount of a movement of a lens group for guiding light from a subject in an optical axis, by controlling the lens group, a shape memory alloy, and an amount of an electricity supplied to the shape memory alloy, the method comprising:

a step of gradually changing an electricity supplied to the shape memory alloy and detecting whether a movement of the lens group starts or not;

a step of determining an amount of an electricity to be supplied to the shape memory alloy which is needed to move the lens group to a predetermined position based on an amount of an electricity supplied when the movement of the lens group starts; and a step of supplying the electricity which is determined to the shape memory alloy.

15. A lens drive method of driving a lens group for controlling an amount of a movement of a lens group for guiding light from a subject in an optical axis, by controlling the lens group, a shape memory alloy, and an amount of an electricity supplied to the shape memory alloy, the method comprising:

a step of gradually changing an electricity supplied to the shape memory alloy and detecting a movement of the lens group at two predetermined positions along the optical axis;

a step of determining an amount of an electricity to be supplied to the shape memory alloy which is needed to move the lens group to a predetermined position based on each of amounts of the electricity supplied when the movement of the lens group are detected at the two predetermined positions; and a step of supplying the electricity which is determined to the shape memory alloy.

16. A method of producing shape memory alloy for use in a drive apparatus comprising a driven body, a shape memory alloy connected to the driven body, a heating section for heating the shape memory alloy, a controlling section for controlling a drive of a driven body by controlling the heating section, the method comprising: a step of applying an aging treatment to the shape memory alloy, the aging treatment repeating a predetermined number or more of times of heating and no-heating processes.

17. The method of producing shape memory alloy of Item 16, wherein the shape memory alloy is heated by applying an electric current to the shape memory alloy.

Effects of the Invention

The invention makes it possible to obtain a small-sized and low cost drive device that has a simple and convenient structure and can stop a lens group at a desired position accurately, a lens barrel, an image pickup apparatus, a lens drive method and a method of producing a shape memory alloy used for the drive device.

Each of FIGS. 7(a), 7(b), and 7(c) is a diagram showing an initial state (no-electricity state) of each part of the lens drive device relating to the first embodiment.

Figure 8:
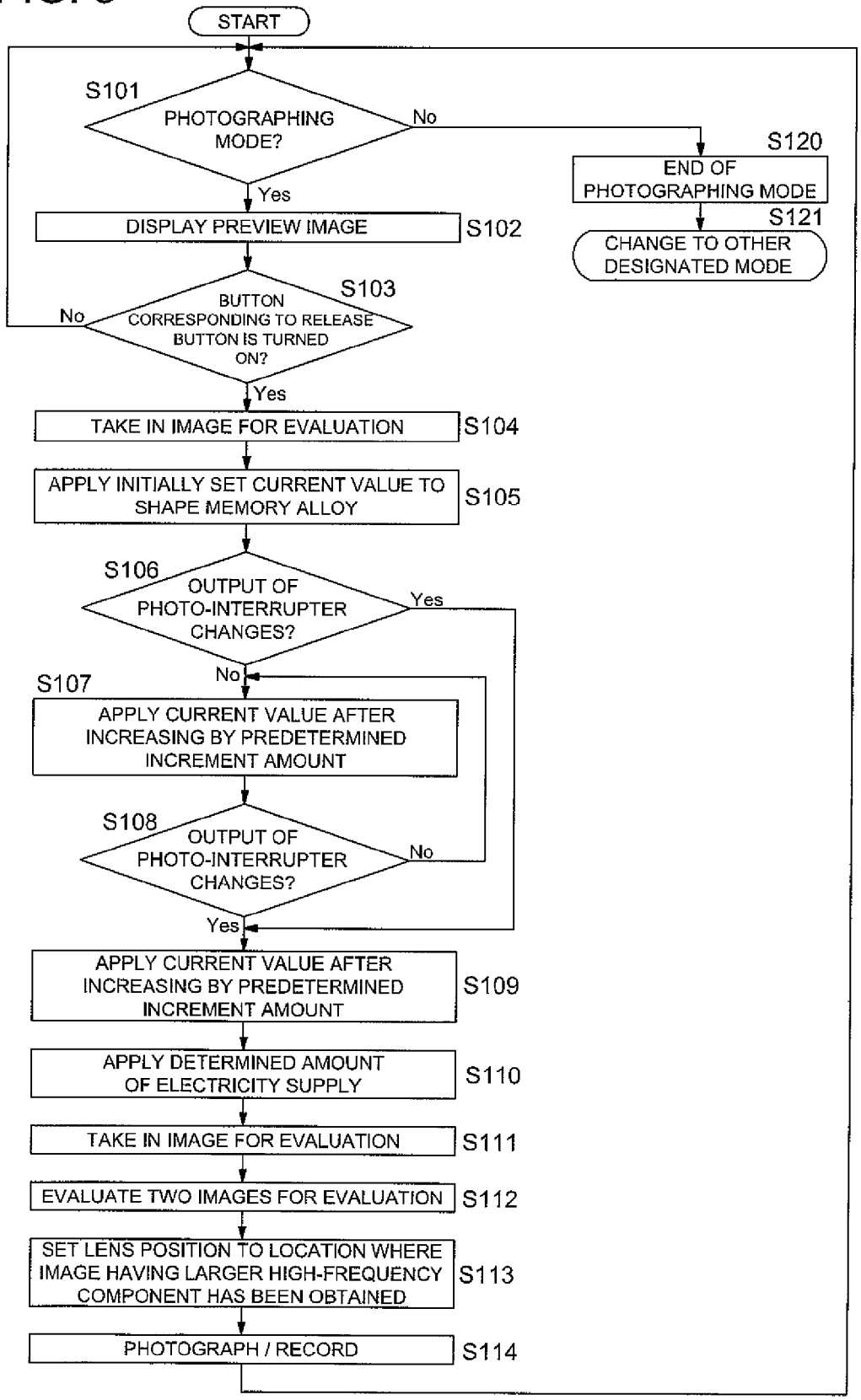

FIG. 8 is a flow chart showing a lens drive method of an image pickup apparatus relating to the first embodiment.

Figure 9:
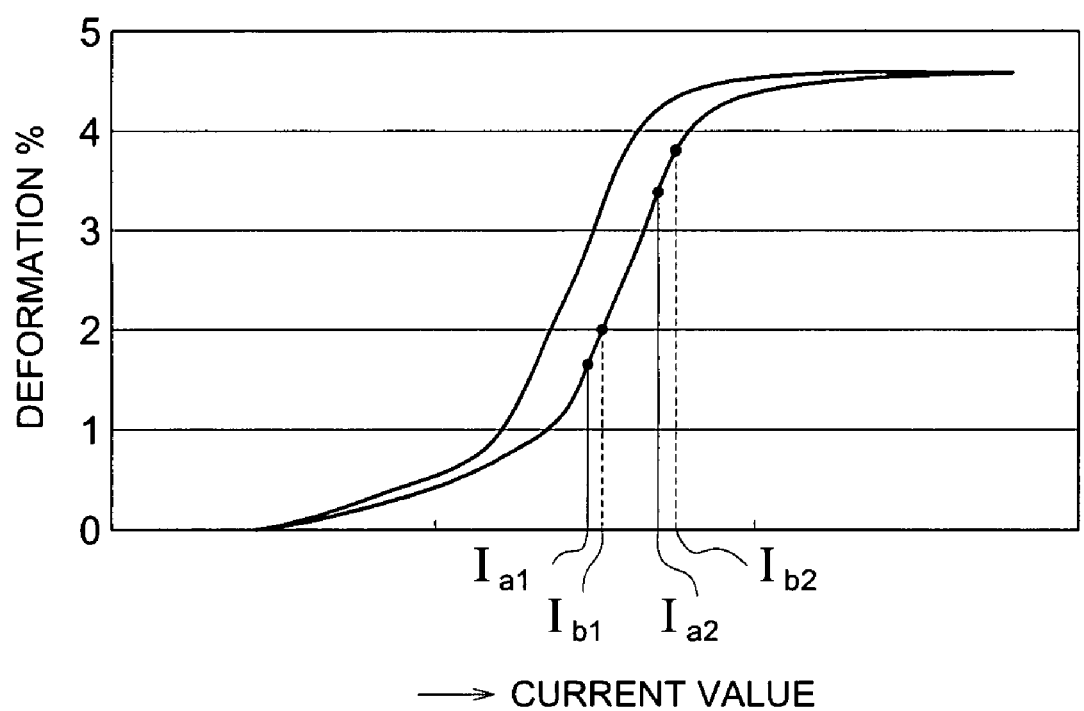

FIG. 9 is a graph showing relationship between an amount of current for a shape memory alloy and deformation of the shape memory alloy, which shows a method of determining the amount of current.

Figure 10:
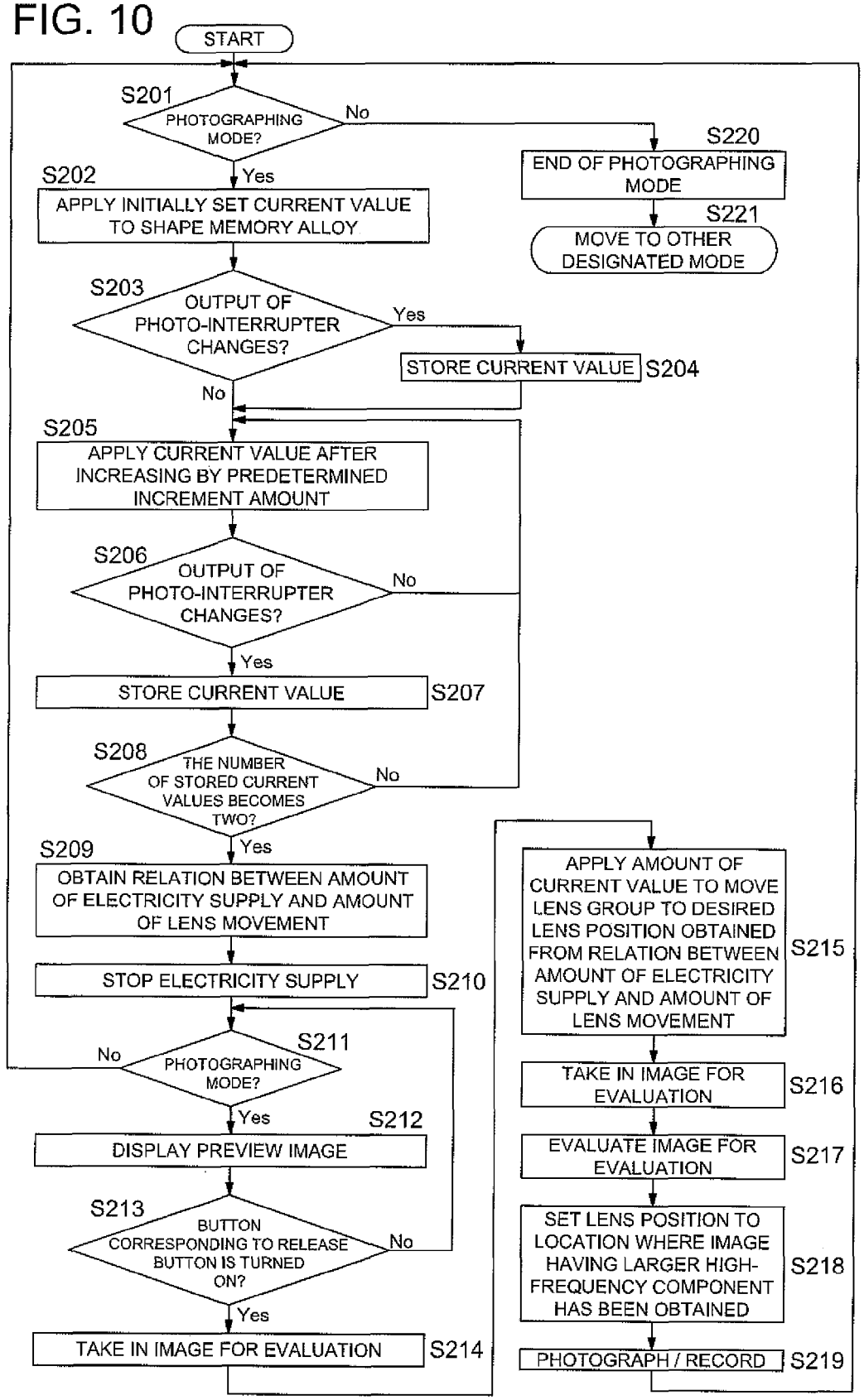

FIG. 10 is a flow chart showing a lens drive method of an image pickup apparatus relating to the second embodiment.

Figure 11:
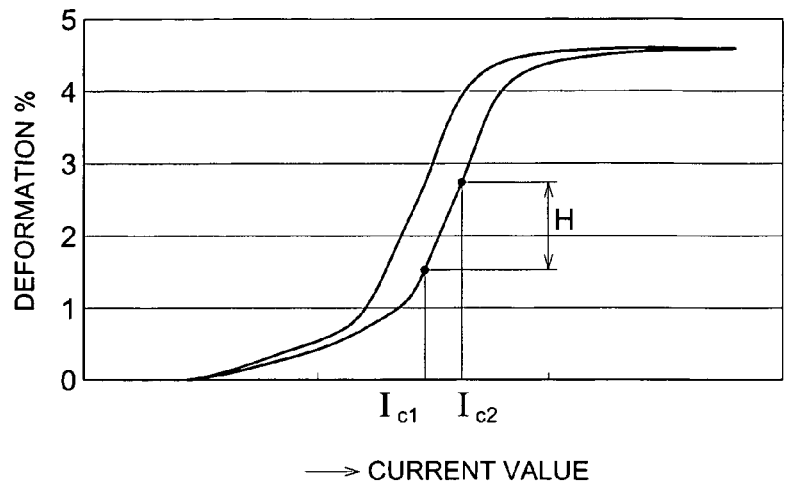

FIG. 11 is a graph showing relationship between an amount of current for a shape memory alloy and deformation of the shape memory alloy, which shows a method of obtaining relationship between an amount of lens movement and an amount of current.

Figure 12:
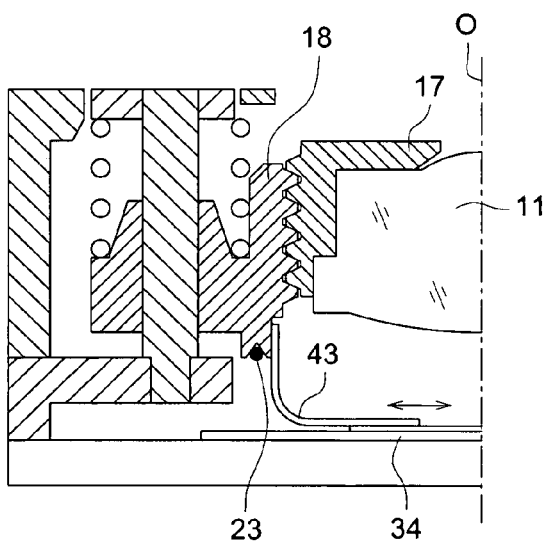

FIG. 12 is a diagram showing another example of a detecting device that detects a movement of a lens group at two predetermined locations in the optical axis direction.

Figure 13:
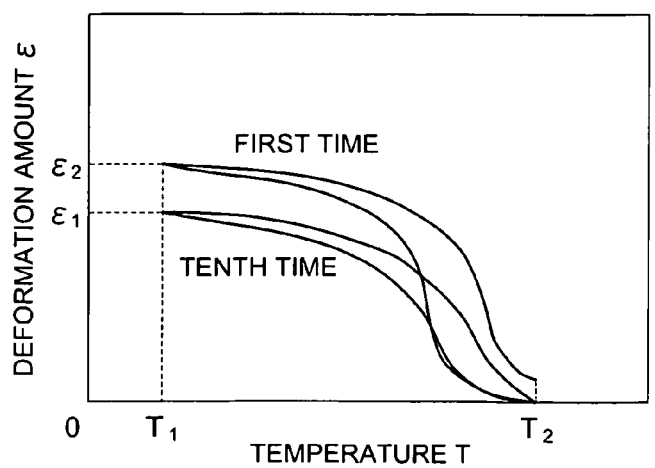

FIG. 13 is a conceptual diagram showing relationship between deformation amount ε and temperature T when electricity is supplied at the first time and the tenth time.

Figure 14:
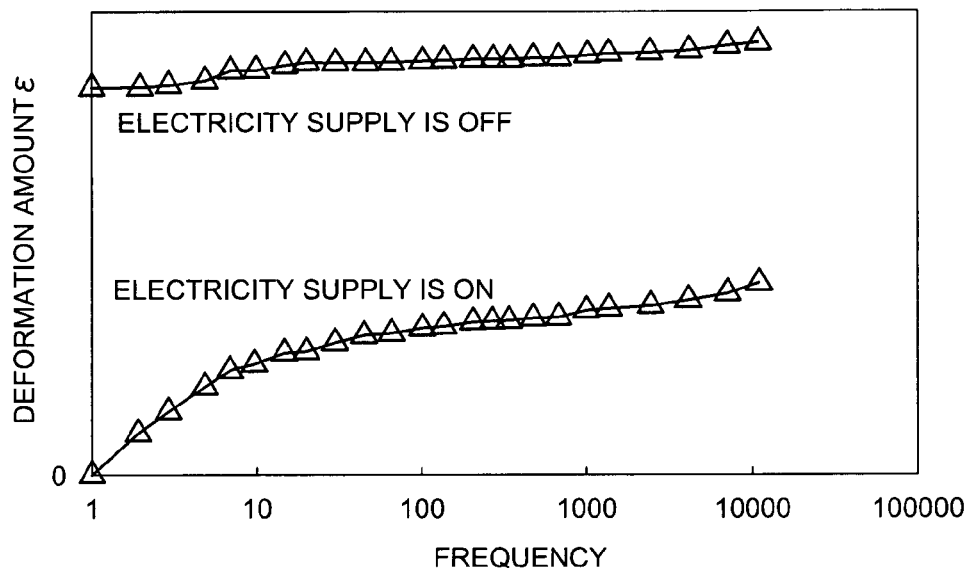

FIG. 14 is a conceptual diagram showing relationship between an amount of deformation and the number of times of supplying electricity.

Figure 15:
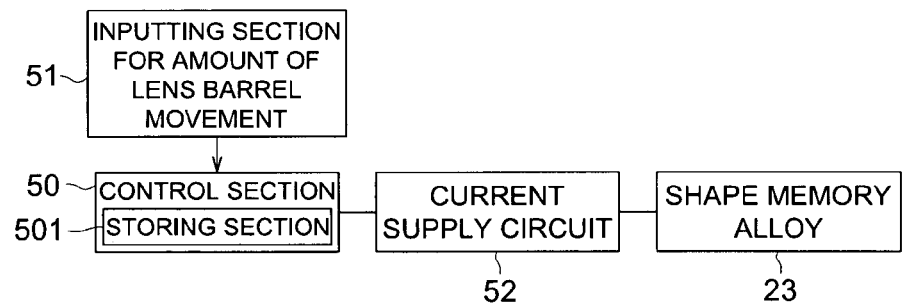

FIG. 15 is a diagram showing a control block of a drive device in the present embodiment.

Figure 16:
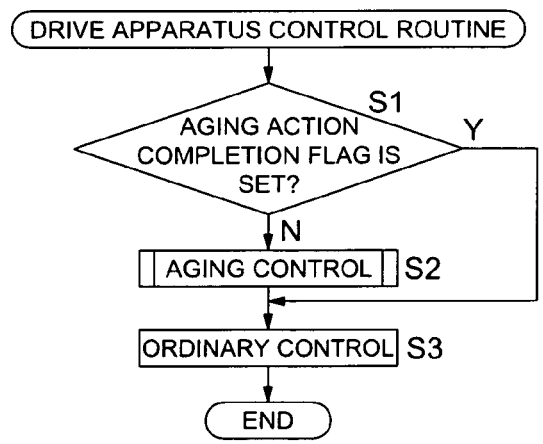

FIG. 16 is a diagram showing a control routine of a drive device in the present embodiment.

Figure 17:
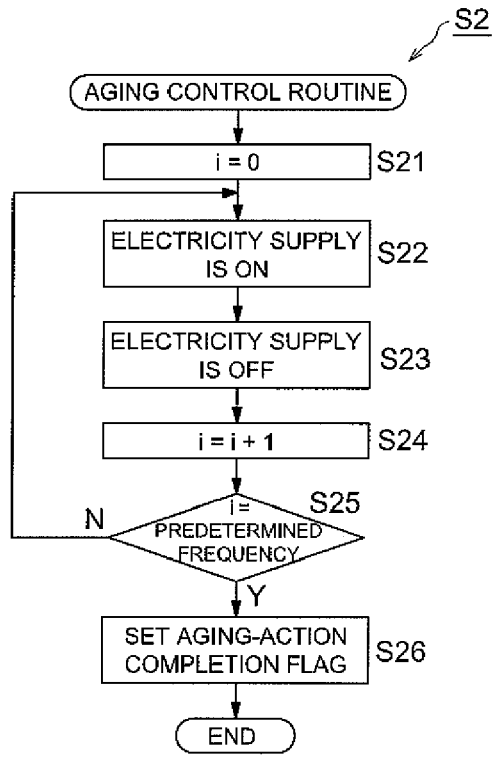

FIG. 17 is a diagram showing an aging control routine.

Figure 18:
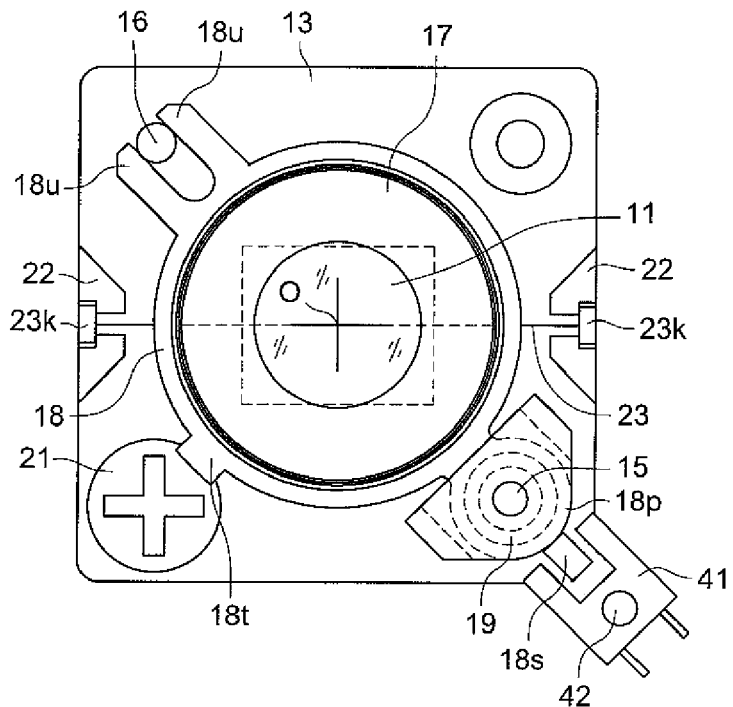

FIG. 18 is a front view showing another example of arrangement of respective parts constituting a lens barrel inside an image pickup apparatus.

Figure 19:
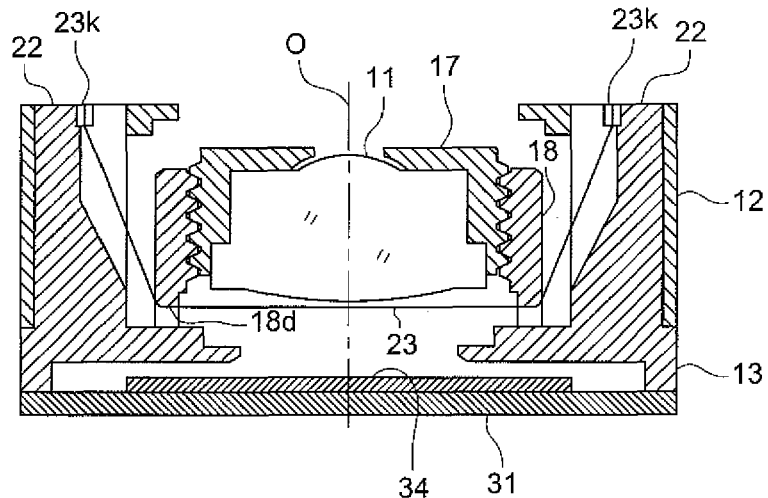
Figure 19:
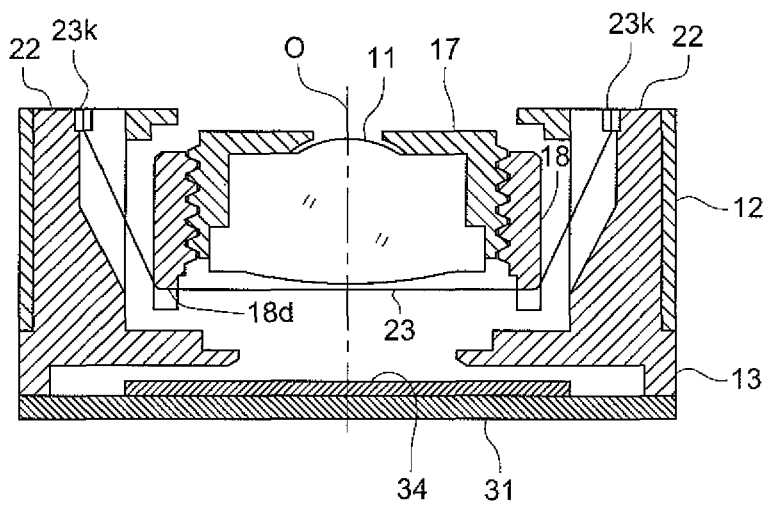

Each of FIGS. 19(a) and 19(b) is a sectional view of the lens barrel inside the image pickup apparatus shown in FIG. 18 which is taken on a plane including the shape memory alloy.

Figure 20:
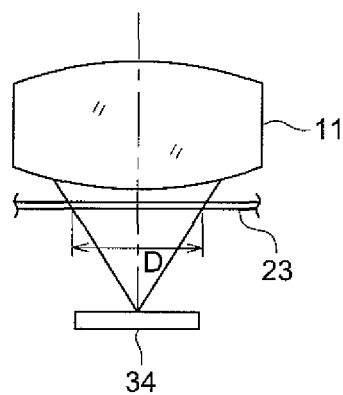
Figure 20:
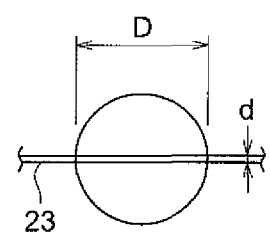

Each of FIGS. 20(a) and 20(b) is an illustration diagram wherein an optical path is interrupted by the shape memory alloy.

Figure 21:
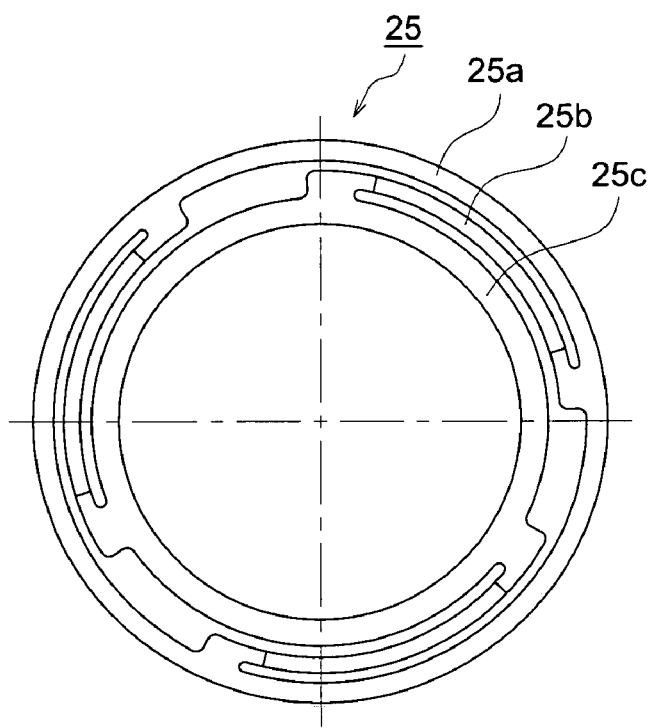

FIG. 21 is a top surface diagram of a leaf spring of a diaphragm type.

Figure 22:
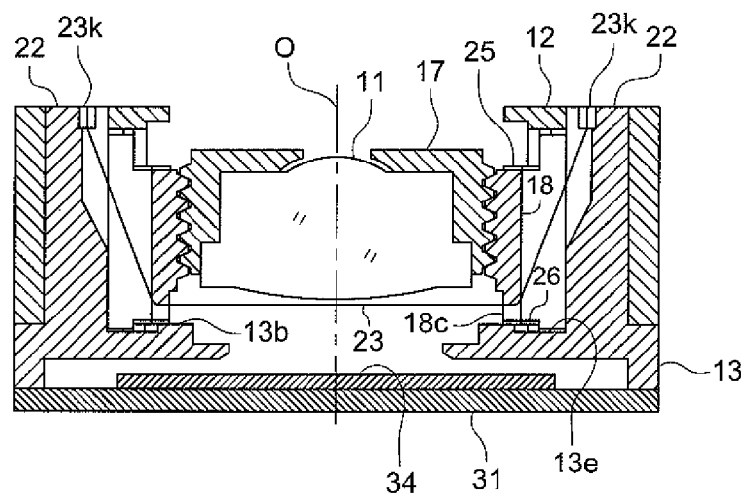
Figure 22:
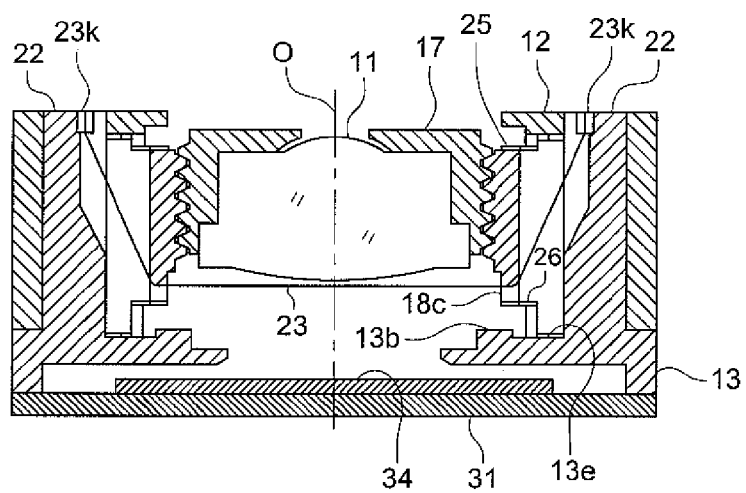

Each of FIGS. 22(a) and 22(b) is a sectional view in which a shape memory alloy is extended.

Figure 23:
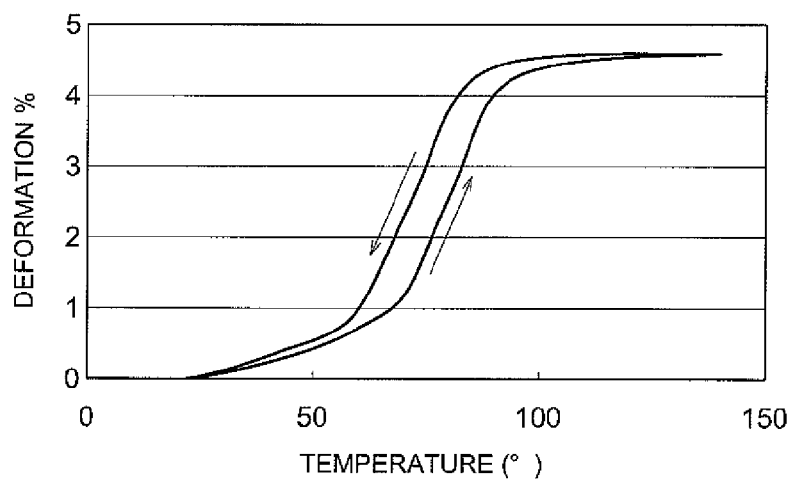

FIG. 23 is a diagram wherein relationship between temperature and deformation of a shape memory alloy is graphed schematically.

EXPLANATION OF NOTATION

11. Lens group
12. Cover member
13. Bottom plate
15, 16. Guide shaft
17. First lens frame
18. Second lens frame
19. Helical compression spring
21. Screw
23. Shape memory alloy
31. Print board
32. Flexible print board
34. Image pickup element
41. Photo-interrupter
100. Image pickup apparatus

BEST MODE FOR CARRYING OUT THE INVENTION

The invention will be explained in detail as follows, referring to the embodiment, to which, however, the invention is not limited.

Figures 1, 2:
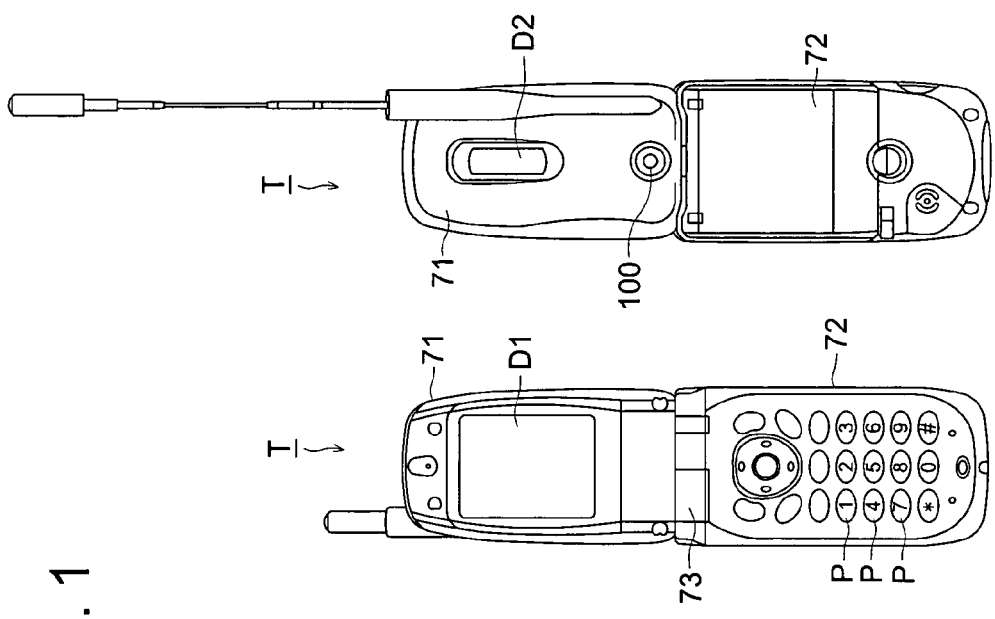
FIG. 1 is an appearance diagram of a cell-phone representing an example of a mobile terminal equipped with an image pickup apparatus relating to the present embodiment.
FIG. 2 is a perspective view of an image pickup apparatus provided as a unit relating to the present embodiment.

FIG. 1 is an appearance diagram of a mobile phone T which is an example of a mobile terminal provided with the image pickup apparatus relating to the present embodiment.

In the mobile phone T shown in FIG. 1, an upper casing 71 as a case provided with the display image screens D1 and D2, and the lower casing 72 provided with operation buttons P, are connected with each other through a hinge 73. The image pickup apparatus 100 is housed below the display image screen D2 in the upper casing 71, and the image pickup apparatus 100 is arranged in such a manner that the light can be taken-in from the outer surface side of the upper casing 71.

Hereupon, this image pickup apparatus 100 may also be arranged above or on the side surface of the display image screen D2 in the upper casing 71. Further, it is of cause that the mobile phone is not limited to a folding type.

FIG. 2 is a perspective view of an image pickup apparatus relating to the present embodiment in the state provided as a unit.

As shown in FIG. 2, an outer surface of the image pickup apparatus relating to the embodiment is composed of box-shaped cover member 12 that has an opening so that lens group 11 may take in light from a subject; bottom plate 13 that fixes thereon the cover member 12 through screw 14 and holds respective members arranged inside; print board 31 that is fixed on the bottom surface of the bottom plate 13, and holds therein image pickup elements mounted therein; and flexible print board 32 that is connected to the print board 31. There is further arranged flexible print board 32f for supplying electric power to a shape memory alloy which will be explained later. Further, the flexible print board 32f is connected also to photo-interrupter 41 that is fixed on the bottom plate 13. This flexible print board 32f may either be constructed integrally with the flexible print board 32 or be constructed separately from the flexible print board 32.

Incidentally, on the flexible print board 32, there is formed contact point section 32t for connecting to another board of a mobile terminal, and reinforcing plate 33 is pasted on the reverse side of the flexible print board 32. Now, the symbol ○ represents an optical axis of lens group 11. Further, the contact point section 32t represents an element which has 20 pins or more such as a power supply, control signals, image signal output and a terminal for inputting to a shape memory alloy, and it is shown schematically.

Next, internal structures of the image pickup apparatus relating to the present embodiment will be explained as follows, referring to FIGS. 3, 4 and 5. Incidentally, in the following figures, the same symbols are given to the same function members for the explanation.

Figure 3:
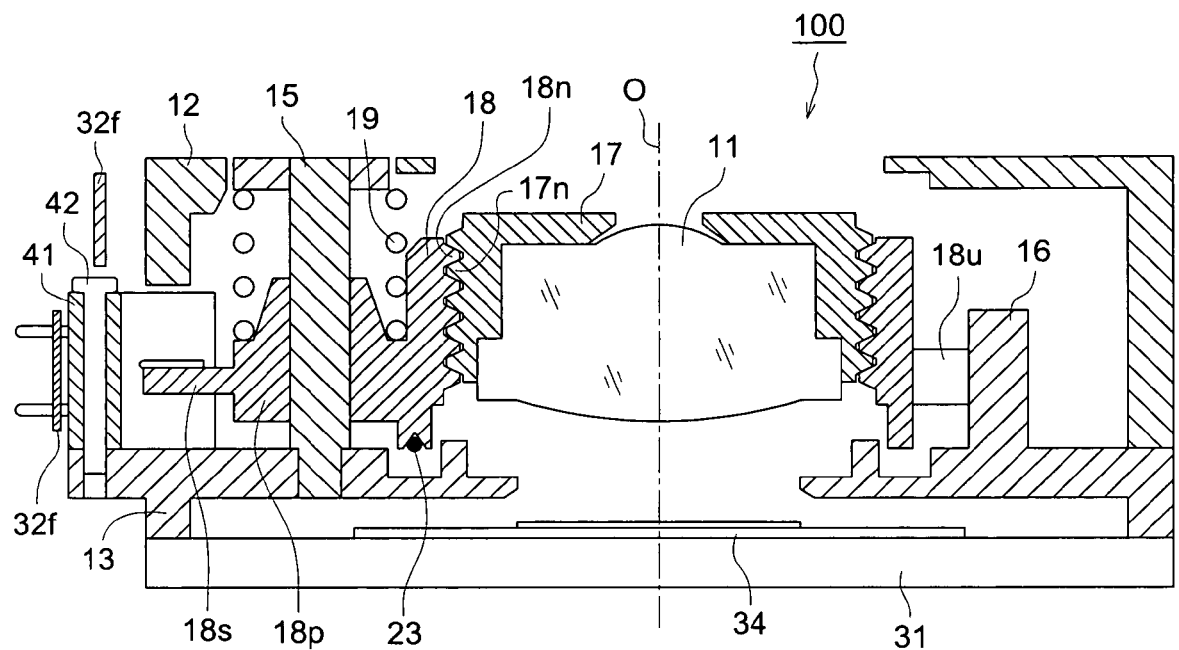
FIG. 3 is a sectional view showing an internal structure of the image pickup apparatus.

FIG. 3 is a sectional view showing the internal structures of the image pickup apparatus. FIG. 3 shows a section taken on line F-F in FIG. 2.

Figure 4:
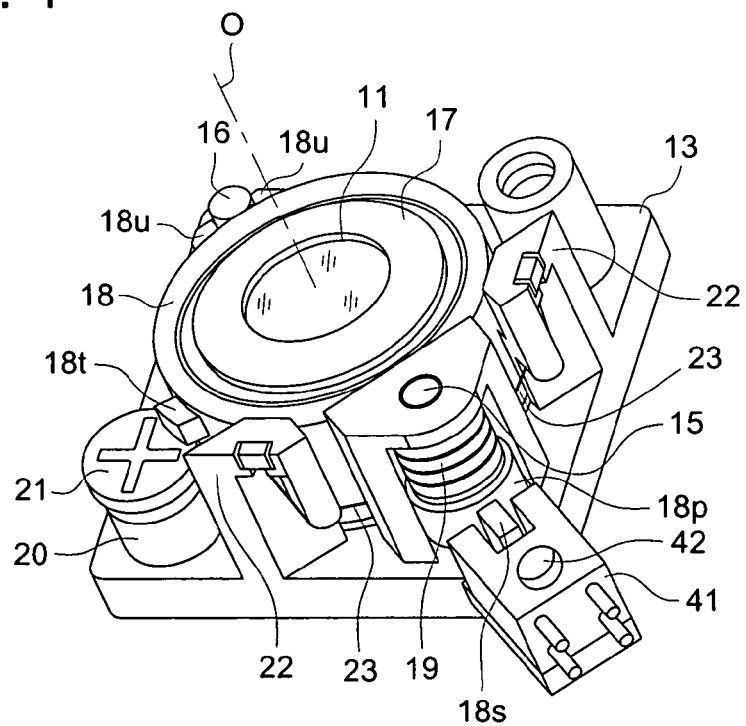
FIG. 4 is a perspective view showing the inside of the image pickup apparatus.

FIG. 4 is a perspective view showing the inside of the image pickup apparatus. FIG. 4 shows a situation wherein cover member 12, print board 31 and flexible print board 32 and 32f are removed from image pickup apparatus 100 shown in FIG. 2.

Figure 5:
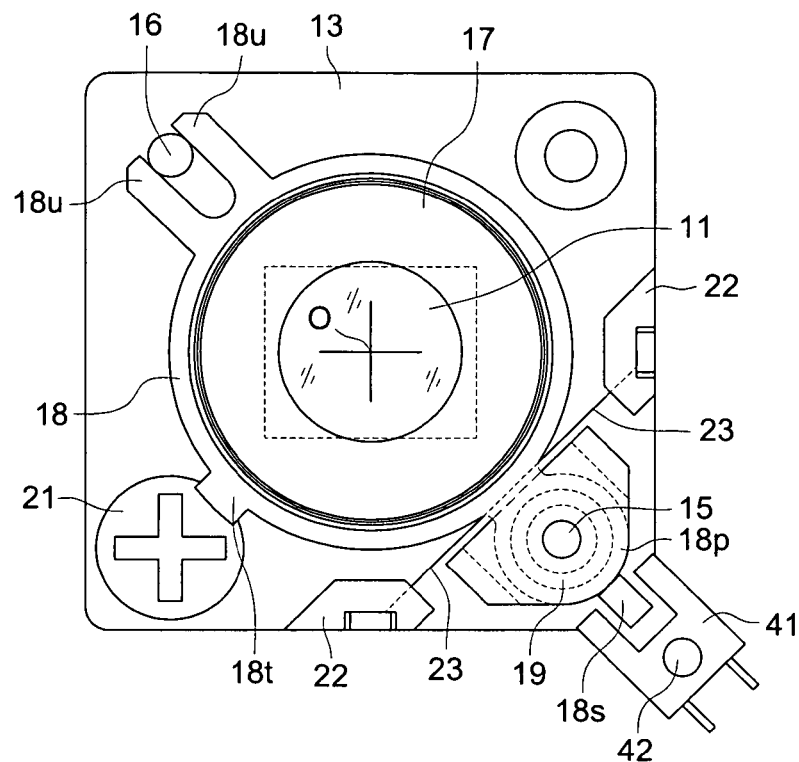
FIG. 5 is a front view showing arrangement of respective parts inside the image pickup apparatus.

FIG. 5 is a front view showing arrangement of respective parts constituting a lens barrel inside the image pickup apparatus. FIG. 5 is a diagram wherein the image pickup apparatus shown in FIG. 4 is viewed from the subject side in the optical axis direction.

Inside the image pickup apparatus 100, there are arranged the first lens frame 17 (hereinafter referred to as lens frame 17) that houses therein lens group 11 that is composed of a single lens or of plural lenses, and the second lens frame 8 (hereinafter referred to as lens frame 18) that holds the lens frame 17 in the outside of lens frame 17.

The lens frame 17 is engaged with the lens frame 18 through screw sections 17n and 18n, and the lens frame 17 can be moved in the optical axis direction against the lens frame 18 when the lens frame 17 is rotated on the lens frame 18. Incidentally, the lens frame 17 and the lens frame 18 may also be arranged so that both of them may be moved relatively in the optical axis direction through a helicoid or through other structures.

The bottom plate 13 is formed to be a quadrangle substantially when it is viewed in the optical axis direction. Guide shafts 15 and 16 are located at almost diagonal positions with in-between optical axis $O$ on the bottom plate. Guide shaft 15 is planted in the bottom plate 13 to be in substantially parallel with the optical axis, and guide shaft 16 is integrally formed with the bottom plate as one body. Alternatively, the guide shaft 15 may also be integrally formed as one body with the bottom plate 13 and the guide shaft 16 may be planted in the bottom plate 13.

Cylindrical section 18p through which the guide shaft 15 is engaged and is penetrated is integrally formed as one body on the lens frame 18, and U-shaped engaging section 18u that engages with the guide shaft 16 is formed on the lens frame 18. Owing to this, the lens frame 18 can move in the optical axis direction along the guide shafts 15 and 16, and lens frame 17 and lens group 11 can move together with the lens frame 18 in the optical axis direction. Further, this cylindrical section 18p is pressed by helical compression spring 19 representing a pressing member in the axial direction of the guide shaft 15. In the present example, the cylindrical section 18p is pressed toward image pickup element 34 arranged in the rear of the lens group 11.

Further, there is integrally formed light-shielding plate 18s on the cylindrical section 18p of the lens frame 18 as one body. This light-shielding plate 18s is arranged in the optical path of light emitted from or received by photo-interrupter 41 that is fixed on the bottom plate 13 with screw 42. Thus, the light-shielding plate 18s is moved by a movement of the lens frame 18 in the optical axis direction, to shield the optical path of light emitted from or received by photo-interrupter 41, or to retreat from the optical path of light emitted from or received by photo-interrupter 41.

Further, there is integrally formed protrusion section 18t on the side of the lens frame 18 as one body. On the other hand, boss 20 is formed on the bottom plate 13, and flat-head screw 21 is screwed in an unillustrated hole of the boss 20. The protrusion section 18t is in contact with a head portion of this screw 21. Namely, the lens frame 18 is pressed toward the image pickup element side by compression coil spring 19 representing a pressing member, and a position of the lens frame 18 on the image pickup element side is determined when the protrusion section 18t touches the head portion of the screw 21 that is a contact member arranged on the bottom plate 13.

Two columnar sections 22 are integrally formed on the bottom plate 13 as one body. These two columnar sections 22 are formed at the position to be arranged at both ends of a line connecting optical axis $O$ of lens group 11 to a center line of the cylindrical section 18p. Both ends of shape memory alloy 23 which is in a string shape are fixed on the two columnar sections 22. The string-like shape memory alloy 23 is extended with being in contact with a bottom portion of the lens frame 18 closer to image pickup element 34 between optical axis $O$ of lens group 11 and the cylindrical section 18p.

Figure 6:
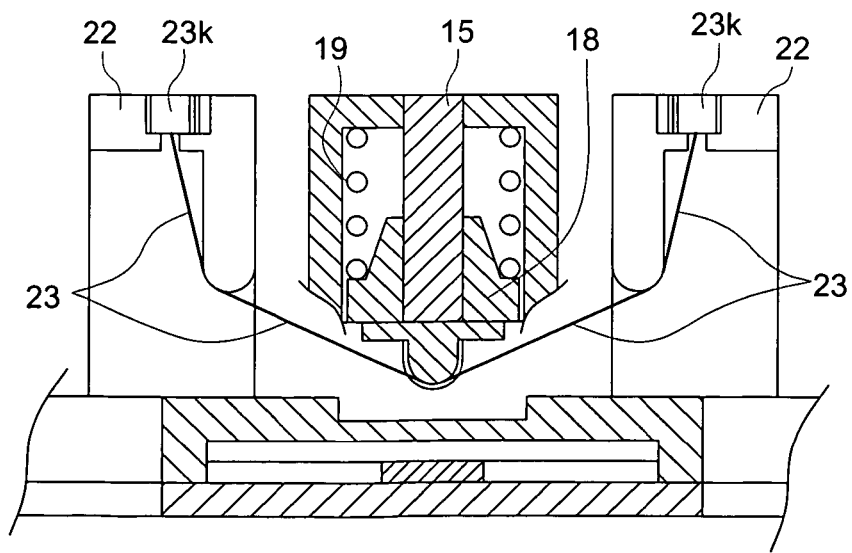
FIG. 6 is a schematic diagram showing relationship for respective parts about which the string-like shape memory alloy is extended.

FIG. 6 is a schematic diagram showing relationship for respective parts about which the shape memory alloy formed in a string shape is extended.

As shown in FIG. 6, both ends of shape memory alloy 23 formed in a string shape are fixed on the two columnar sections 22 which are integrally formed on the bottom plate 13 as one body. The shape memory alloy 23 formed in a string shape is extended in a way so that it comes in contact with a bottom portion of the lens frame 18 at about the center portion thereof, after angles of the shape memory alloy 23 formed in a string shape are changed by a part of the columnar section 22 to be symmetrical from both of the fixed portions.

Further, each of the both end portions of the shape memory alloy 23 formed in a string shape is cut with being held by plate member 23k, and this plate member 23k is fixed at the upper portion of the columnar section 22.

When predetermined current or voltage is applied to the shape memory alloy 23 thus extended, from flexible print board 32f (see FIG. 2) through the plate member 23k, the shape memory alloy 23 representing a resistive element generates heat to raise its temperature, and it changes to shorten its total length, namely, it is contracted. Due to this, the lens frame 18 can be moved in the optical axis direction $O$ along guide shafts 15 and 16, resisting helical compression spring 19 representing a pressing member. Namely, lens group 11 held by lens frames 18 and 17 can move toward a subject along optical axis $O$ to adjust a focal position with a shorter distance.

The foregoing is the internal structure of the image pickup apparatus 100 relating to the present embodiment.

Next, a drive device and a drive method for moving lens group 11 of image pickup apparatus 100 having the aforesaid structure housed in cell-phone T will be explained as follows.

FIRST EMBODIMENT

First, a lens drive device and a lens drive method relating to the First Embodiment will be explained. In the First Embodiment, the presence or absence of movement of a lens group is detected by gradually changing electricity supplied to a shape memory alloy. Based on an amount of electricity supplied at a point in time when the movement is detected, an amount of the electricity to move the lens group by a predetermined amount in the optical axis direction is determined, and then, drive control for the lens group is conducted.

Each of FIGS. 7(a), 7(b) and 7(c) is a diagram showing an initial state (state of no-electricity) of each part of lens drive device 100 relating to the First Embodiment. FIG. 7(a) is a diagram schematically showing positional relationship between light-shielding plate 18s and photo-interrupter in the initial state, FIG. 7(b) is a diagram showing output of photo-interrupter 41 and FIG. 7(c) is a diagram showing relationship between lens frame 18 and shape memory alloy 23.

Figure 7:
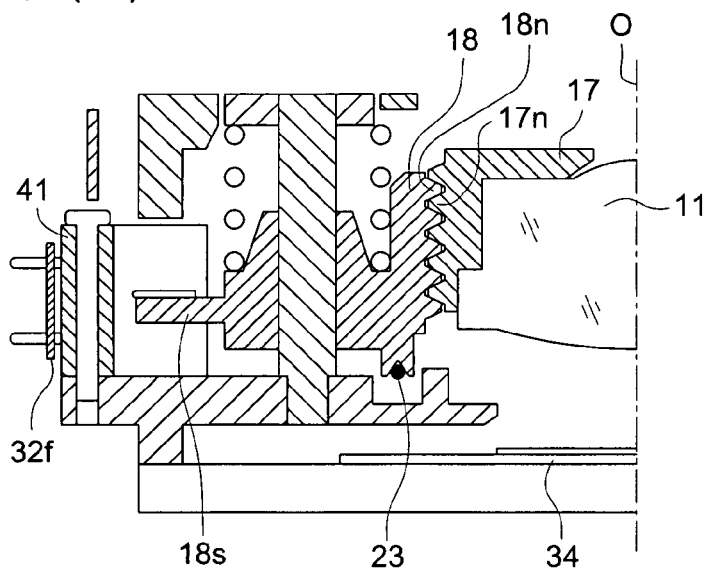
Figure 7:
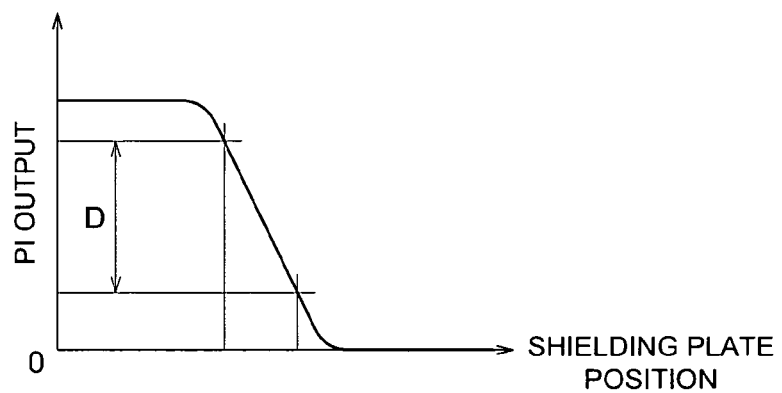
Figure 7:
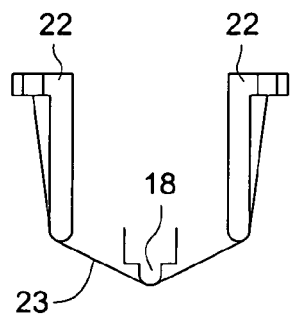

First, lens frame 18 of image pickup apparatus 100 is adjusted so that it may be located at its predetermined position, and a position of the light-shielding plate 18s is adjusted so that a part of a light flux emitted from or received by photo-interrupter 41 may be shielded as shown in FIG. 7(*a*). This adjustment is conducted by rotating flat-head screw 21 and by moving the touching protrusion section 18*t* in the optical axis direction (see FIGS. 4 and 5).

More closely, a position of the lens frame 18 is determined by flat-head screw 21 so that a position of the light-shielding plate 18*s* may agree with a position in a range of illustrated D representing a transition area between the state of shielding and the state of retreating caused by light-shielding plate 18*s* within an area where light is emitted from or received by photo-interrupter 41 shown in FIG. 7(*b*), namely, a position of the light-shielding plate 18*s* may agree with a position where the light-shielding plate 18*s* shields a part of a light flux emitted from or received by photo-interrupter 41.

Next, focal point is adjusted by moving lens frame 17 in the optical axis direction ○ by rotating the lens frame 17 on lens frame 18. A focal point of lens group 11 held by lens frame 17 is adjusted so that, for example, a subject positioned at a hyperfocal distance may be focused on an image pickup surface of image pickup element 34. In this case, the shape memory alloy 23 is in the tensional state against lens frame 18 as shown in FIG. 7(*c*). A component in the optical axis direction of force applied on SMA is small, thus, the shape memory alloy 23 remains stationary under the condition that the shape memory alloy 23 is elongated slightly by pressing force of helical compression spring 19, and that protrusion section 18*t* of the lens frame is in contact with a head of screw 21. Incidentally, SMA may also be in the state having-slight slackness between itself and lens frame 18.

Namely, the lens drive device 100 relating to the First Embodiment is adjusted so that a subject positioned at a hyperfocal distance may be focused under the state of no-electricity. Incidentally, this focus position is not limited to only to the hyperfocal distance, and it may also be a position where a subject positioned at an infinite distance is focused. However, in the present embodiment, an explanation is given under the condition of an adjustment where a subject positioned at a hyperfocal distance is focused.

FIG. 8 is a flow chart showing a lens drive method of image pickup apparatus 100 relating to the First Embodiment. The present embodiment is described with following the flow chart shown in FIG. 8.

In FIG. 8, it is confirmed whether a photographing mode is set or not (step S101). When the mode other than the photographing mode is designated due to certain operations (step S101; No), the photographing mode is terminated (step S120) and the flow moves to the other mode which is designated (step S121).

When the photographing mode is set (step S101; Yes), the image pickup element is driven to display preview images (which are also called through images) on a display screen on a real time basis (step S102). Then, the flow is in a state waiting for an operation that a button corresponding to a release button among buttons on a cell-phone is turned on (step S103). When a button corresponding to a release button is not turned on (step S103; No), the flow returns to step S101.

When a button corresponding to a release button is turned on (step S103; Yes), an image for evaluating focus is taken in (step S104). It means that the image for evaluating focus taken in at step S104 is an image on the occasion where a lens group is at a hyperfocal position.

Then, a current value set in advance is applied to the shape memory alloy (step S105), and an output of a photo-interrupter is judged whether it changes or not (step S106). When the output of the photo-interrupter does not change (step S106; No), a current whose value increases from the current value applied previously by a predetermined increment amount is applied to the shape memory alloy (step S107). Then, an output of a photo-interrupter is judged again whether it changes or not (step S108). When the output of the photo-interrupter does not change (step S108; No), the flow returns to step S107, a current whose value further increases from the current value applied previously by a predetermined increment amount is applied to the shape memory alloy, and judgment whether the output of the photo-interrupter changes at step S108 or not is repeated.

It means that a current value applied to the shape memory alloy gradually increases until the moment when the output of the photo-interrupter changes. The current value at which the output of the photo-interrupter starts changing means that the current value at which a component in the optical axis direction of force that acts on the shape memory alloy exceeds pressing force in the optical axis direction by helical compression spring 19, and protrusion section 18*t* of the lens frame leaves a head of screw 21.

When the output of the photo-interrupter changes (step S108; Yes), a current amount to be applied to the shape memory alloy for moving a lens group to a predetermined position (macro position) is determined based on the current value on that occasion (step S109). The amount of current thus determined is applied to the shape memory alloy (step S110). The method of determining an amount of current in step S109, for example, is described below.

FIG. 9 is a graph showing relationship between a current amount for a shape memory alloy and deformation of the shape memory alloy, and showing a method of determining a current amount. The horizontal axis represents the current value, and the vertical axis represents the deformation.

When a current value $I_{a1}$ is obtained at a point of time when an output of the photo-interrupter is changed, current value $I_{a2}$ which is increased by a prescribed amount from the current value $I_{a1}$ is applied to the shape memory alloy. On the other hand, when a current value $I_{b1}$ is obtained at a point of time when an output of the photo-interrupter is changed, current value $I_{b2}$ which is increased by a prescribed amount from the current value $I_{b1}$ is applied to the shape memory alloy. By doing this, it is possible to move lens frame 18 from its initial state by a predetermined amount. Namely, it is possible to move a lens group from a position for focusing to hyperfocal distance to a position for macro photographing.

By employing the structure, as stated above, determining an amount of electricity to move the lens group to the position for macro photographing based on the current value at the point of time when an output of the photo-interrupter changes, and supplying the amount of electricity to the shape memory alloy, it is possible to dissolve microscopic errors in a length of the shape memory alloy, mounting errors and un-uniformity of an amount of movement of lens group caused by ambient temperatures, and to obtain an image pickup apparatus which does not provides individual difference when moving a lens group to a macro position.

Incidentally, though a method of determining a current value in step S109 has been explained by using a graph, it is naturally possible to employ those using a lookup table and to employ those determining by calculation.

Returning to the flow in FIG. 8, the lens group moves to the macro position in step S110. At this position, an image for evaluating focus is taken in (step S111). Then, two images taken in at step S104 and step S111 are evaluated (step S112).

Then, a lens group is set at the position where the image having larger high-frequency component between two images in evaluation in step S112 (step S113). Specifically, when the image for evaluation obtained in step S104 has larger high-frequency component, applying current to the shape memory alloy is stopped and a lens group is positioned in the initial state, namely, the lens group is located at the position for focusing to the hyperfocal distance. When the image for evaluation obtained in step S111 has larger high-frequency component, the current value determined in step S110 is applied to the shape memory alloy, and the lens group is located at the macro photographing position.

Then, photographing and image recording on a recording material are conducted at the lens group position established in step S113 (step S114), and the flow returns to step S101.

As explained above, by detecting whether the movement of the lens group has started or not while gradually changing an amount of electricity supplied to the shape memory alloy, then, by determining an amount of electricity to move the lens group to a desired position, based on the amount of electricity at the time when the movement starts, and by applying the amount of electricity thus determined to the shape memory alloy, it is possible to dissolve microscopic errors in a length of the shape memory alloy, mounting errors and un-uniformity of an amount of movement of lens group caused by ambient temperatures, and to obtain a lens drive device which does not provide individual difference when moving a lens group to a macro position, and thereby to obtain a small-sized and low-cost image pickup apparatus wherein the structure is simple, and a lens group can be stopped accurately at a desired position.

Incidentally, although the explanation has been given about the position control for two points including a hyperfocal position and a macro position, in the aforesaid explanation, it is also possible to provide a structure such that plural current values each being increased from $I_{a1}$ are established stepwise, to be capable of being stopped at plural steps of lens positions. Further, though the explanation uses the example wherein a position for detecting changes of output of a photo-interrupter and a hyperfocal position of the lens are at the substantially same position, the present invention is not limited to this. A position of the lens which is protruded by a prescribed distance from the hyperfocal position may also be set as a position for detecting changes of output of a photo-interrupter.

Further, though the explanation has so far been given referring to the example of a self-focusing image pickup apparatus, the invention can also be applied to manual setting as the followings: when the hyperfocal position is selected, the electricity does not supplied to the shape memory alloy, while, when a macro position is selected, a position of a lens group is set manually by following operations of step S105-step S110 in FIG. 8.

Further, in the aforesaid example, a photo-interrupter is used to detect whether the movement of the lens group has started or not. However, it is also possible to provide a structure, for example, to monitor a predetermined area of preview images continuously, and a point of time when the focusing condition changes is regarded as the time of starting movement.

SECOND EMBODIMENT

In the Second Embodiment, movement of the lens group is detected at two locations by gradually changing current values to be supplied to the shape memory alloy. Based on the amounts of electricity at points of time when movement of lens group were detected at two predetermined positions, an amount of electricity necessary for moving the lens group to the desired position is determined, and then, drive control for the lens group is conducted.

Initial state (state of no-electricity) of each section of lens drive device 100 is the same as one shown in FIGS. 7(a), 7(b), and 7(c), and it is preferable that light-shielding plate 18s approaches the very limit of an optical path for emitting light from or receiving light on a photo-interrupter, and shields neither emitted light nor received light.

FIG. 10 is a flow chart showing a lens drive method of image pickup apparatus 100 relating to the Second Embodiment. An explanation will be given as follows, referring to the flow chart shown in FIG. 10.

In FIG. 10, it is confirmed whether a photographing mode is set or not (step S201). When the mode other than the photographing mode is designated due to certain operations (step S201; No), the photographing mode is terminated (step S220) and the flow moves to the other mode which is designated (step S221).

When the photographing mode is set (step S101; Yes), a current value set in advance is applied to the shape memory alloy (step S202), and output of a photo-interrupter is judged whether it is changed or not (step S203). When output of a photo-interrupter changes (step S203; Yes), the applied current value is stored (step S204).

When the output of the photo-interrupter does not change (step S203; No), a current whose value increases from the current value applied previously by a predetermined increment amount is applied to the shape memory alloy (step S205). Then the output of the photo-interrupter is judged again whether it changes or not (step S206).

When the output of the photo-interrupter does not change (step S206; No), the flow returns to step S205, and a current whose value further increases from the current value applied previously by a predetermined increment amount is applied to the shape memory alloy, and judgment to check whether the output of the photo-interrupter changes or not (step S206) is repeated.

When the output of the photo-interrupter changes (step S206; Yes), the applied current value is stored (step S207). Then, it is judged whether the number of the stored current values becomes two (step S208). When it remains to be one (step S208; No), the flow returns to step S205 and a current whose value further increases from the current value applied previously by a predetermined increment amount is applied to the shape memory alloy, to repeat step S205 and step S206 until the output of the photo-interrupter changes again. When the number of the stored current value becomes two (step S208; Yes), the flow moves to step S209, and relationship between an amount of lens movement and an amount of current is obtained from two current values obtained. The relationship obtained in the step S209 is as follows.

FIG. 11 is a graph showing relationship between an amount of current and deformation that shows a method of obtaining relationship between an amount of lens movement and an amount of current. The horizontal axis represents a current value and the vertical axis represents deformation.

Output of the photo-interrupter changes, at the first time, at the point of time when light-shielding plate 18s united with lens frame 18 starts moving to the subject side in the optical axis direction from the initial state shown in FIG. 7(a). Output of the photo-interrupter changes, at the second time, at the point of time when the light-shielding plate 18s retreats from an area for light emitted from or light received on a photo-interrupter after moving toward the subject side in the optical axis direction. Namely, with respect to the stored two current values, the first current value is one at the point of time when a component in the optical axis direction of force applied to shape memory alloy exceeds pressing force in the optical axis direction by helical compression spring 19 and protrusion section 18t of lens frame leaves a head portion of screw 21; and the second current value is one at the point of time when lens frame 18 is moved by an amount equivalent to a thickness in the optical axis direction of light-shielding plate 18s.

In FIG. 11, a current value $I_{c1}$ is obtained at the point of time when the output of a photo-interrupter changes first time, and a current vale $I_{c2}$ is obtained at the point of time when the second output of a photo-interrupter changes. When the current value increases from $I_{c1}$ to $I_{c2}$, a deformation factor is changed, which means that lens frame 18 is moved by an amount equivalent to a thickness in the optical axis direction of light-shielding plate 18s by changes of illustrated H.

Namely, when a thickness of light-shielding plate 18s is represented by A (mm), a current value to move lens frame 18 by B (mm) in the optical axis direction from the initial state shown in FIGS. 7(a), 7(b), and 7(c) is expressed by $I_{c1}$+B $(I_{c2}-I_{c1})$/A.

Owing to the foregoing, it is possible to obtain a current value to move lens frame 18, namely, lens group 11 from a position of the initial state to the position on the subject side in the optional optical axis direction.

Returning to the flow in FIG. 10, electricity to the shape memory alloy is stopped (step S210) after storing relationship obtained in step S209. Owing to this, lens frame 18 is restored to the initial state.

Then, when it is judged again whether a photographing mode is set or not (step S211) and the photographing mode is not set (step S211; No), the flow returns to step S201. While, when the photographing mode is set (step S211; Yes), an image pickup element is driven, and a preview image (which is also called a through image) is displayed on a display screen on a real time (step S212). Then, a button corresponding to a release button among buttons on a cell-phone is on standby to be turned on (step S213). When the button corresponding to a release button is not turned on (step S213; No), the flow returns to step S211.

When the button corresponding to a release button is turned on (step S213; Yes), an image for evaluating focusing is taken in first (step S214). Namely, the image for evaluating focusing which is taken in at step S214 is an image when a lens group is at a hyperfocal position.

Then, relationship between a current amount to be applied to a shape memory alloy obtained in the foregoing and an amount of movement of a lens frame is used to obtain a current value to move the lens group to the desired lens position, and this current value is applied to the shape memory alloy (step S215). Due to this, the lens group is moved from its initial position to a desired focusing position on the short distance side. At this position, an image for evaluating focusing is taken in (step S216).

Incidentally, when plural focusing positions on the short distance side has been set, a current value to move to each lens position is obtained and step S215 and step S216 are repeated, thereby, an image for evaluating a focus is taken in at each position.

Then, images for evaluation taken in at step S214 and at step S216 are evaluated (step S217).

The lens group is set at the position at which evaluation at step S217 was obtained, for example, at which an image having larger high frequency component among obtained images for evaluation was obtained (step S218). Specifically, when an obtained image for evaluation at step S214 contains larger high frequency component, applying of a current to the shape memory alloy is stopped. The lens group is set to the initial state, namely, a lens group is set at a position where the lens group is focused at a hyperfocal position. When any of images for evaluation obtained in step S216 contains larger high frequency component, the lens group is set to state wherein an amount of current to move the lens group to the position where the aforesaid image was obtained is applied to a shape memory alloy.

Then, photographing and recording of images on a recording medium are conducted at the position where the lens group was set in step S218 (step S219), and the flow returns to step S201.

In other words, the Second Embodiment is one wherein a current value to move a lens group by an amount determined in advance is detected, and based on this, an amount of current to move to the desired position is obtained.

As explained above, by providing a structure wherein a movement of a lens group is detected at two predetermined positions in the optical axis direction while gradually changing electricity supplied to the shape memory alloy, and an amount of electricity to move a lens group to the desired position is determined based on the amount of electricity at each of these two positions, and a lens group is moved to the desired position by supplying the determined amount of electricity to the shape memory alloy, it is possible to dissolve fluctuations of an amount of movement of the lens group caused by errors in length of the shape memory alloy, errors in mounting and by ambient temperatures, and to obtain a lens drive device which does not provides individual difference when moving a lens group, to obtain a small-sized and low cost image pickup apparatus that can stop the lens group accurately at the desired position with a simple structure.

Further, by detecting the movement at two positions, it is possible to conduct accurate position control, even when fluctuations of inclination in characteristic curves caused by un-uniformity of pressing force of helical compression spring and by un-uniformity of wire diameter of the shape memory alloy are generated, which is different from the occasion where detection is conducted at one position.

Incidentally, although the explanation has been given referring to the example of the self-focusing image pickup apparatus, the invention can be applied also the occasion of manual setting. In this case, changing the steps S214-S218, when the hyperfocal position is selected, electricity to the shape memory alloy is stopped, while, when the focus position on the desired short distance side is selected, a current value to move the lens group to the designated lens position is obtained from the relation acquired in step S209, and it is applied to the shape memory alloy. Thus, it is possible to conduct manual setting.

Further, although the explanation has been given referring to the occasion where the initial setting of the lens group is on the hyperfocal position, it is also possible to use a position for focusing on infinity in place of the hyperfocal position, or, it is further possible to position the lens group on the image pickup element side.

In the foregoing, current values at two positions where photo-interrupter outputs changes were obtained before taking in images for evaluation, in the structure. However, the invention is not limited to this, and current values may also be obtained after the step S213, or it is also possible to obtain current value with a change of the first photo-interrupter output before step S213 and to obtain current value with a change of the second photo-interrupter output after step S213.

FIG. 12 is a diagram showing another example of a detecting device that detects a movement of a lens group at prescribed two positions in the optical axis direction.

As shown in FIG. 12, sheet member 43 having flexibility is fixed on lens frame 18. It is preferable that the sheet member 43 is made of a material having light shielding effect.

An edge portion on one side of the sheet member 43 is superposed as illustrated on an area of pixels that are not used for image among light-receiving pixels of the image pickup element 34, to shield a light flux of a subject coming from lens group 11. If lens frame 18 is moved from this state in the optical axis direction, the sheet member 43 fixed on the lens frame 18 is moved in the direction of the illustrated arrow, and pixel output of the pixel area that is not used as an image is changed.

Namely, by monitoring pixel output of image pickup element 34 while gradually changing electricity supplied to shape memory alloy 23, and by detecting the change of pixel output on the pixel area that is not used for image, a start of movement of the lens group can be detected. Further, when movement between prescribed number of pixels is detected by the sheet member 43, movement of a lens group can be detected at prescribed two positions in the optical axis direction.

By providing this structure, it is possible to detect movement of a lens group without adding a new member such as a photo-interrupter, and thereby to make an image pickup apparatus to be lower cost.

Though the explanations were given in the aforesaid First and Second Embodiments referring to those wherein a current value changes when electricity supplied to the shape memory alloy, the invention is not limited to this. It is naturally possible to employ the structure wherein voltage is changed or a current value is fixed with duty ratio being changed. Further, the shape memory alloy, as described above, provides an initial creep phenomenon wherein a deformation amount changes with the number of times of turning electricity on in the initial stage where the frequency of turning electricity on is small. The initial creep phenomenon is described as follows.

FIG. 13 is a conceptual diagram showing relationship between deformation amount $\epsilon$ and temperature T when the electricity is supplied at the first time and the tenth time. FIG. 13 shows an occasion wherein a prescribed load weight is impressed on a string-like shape memory alloy to change a temperature of the shape memory alloy in order of T2, T1, and T2 (where T1<T2). A deformation amount represented by the vertical axis indicates a rate of an elongated length at each frequency to the string length at temperature T2 at the start, which is defined as the standard.

As shown in FIG. 13, a deformation amount when electricity is supplied at the tenth time is smaller than that at the first time. For example, a deformation amount $\epsilon1$ is obtained when electricity is supplied at the tenth time in the occasion of lowering a temperature from T2 to T1. The deformation amount $\epsilon1$ is smaller than $\epsilon2$ that is a deformation amount when the electricity is supplied at the first time.

FIG. 14 is a conceptual diagram showing relationship between a deformation amount and the number of times of supplying electricity. FIG. 14 shows an occasion wherein a prescribed load weight is applied to a string-like shape memory alloy, and prescribed current is applied to the shape memory alloy for the prescribed length of time to turn the current ON and to the prescribed length of time to turn the current OFF. A deformation amount represented by the vertical axis indicates a rate of an elongated length to the string length when the electricity is turned on at first time, which is defined as the standard.

As shown in FIG. 14, a deformation amount during the electricity is turned ON is greatly changed up to the moment of about (ten-odd)$^{th}$ electricity supply. These phenomena mean that accurate position control is difficult, because an amount of distortion is changed undesirably even when the same current is applied, until the moment of about (ten-odd)$^{th}$ electricity supply.

It is preferable to do as follows for coping with the initial creep phenomenon described above. FIG. 15 is a diagram showing a control block of a drive device in the present embodiment. Control section 50 controls a current to be applied to shape memory alloy 23 through current supply circuit 52, based on an amount of lens barrel movement inputted from lens barrel movement amount input section 51. In the control section 50, there is provided memory section 501 that is constituted with a nonvolatile memory such as EEPROM that stores the number of times of supplying electricity one after another.

FIG. 16 is a diagram showing a control routine of a drive device in the present embodiment. Control section 50 judges first whether an aging action completion flag is set on memory section 501 in control section 50 or not (S1). When the aging action completion flag is judged to be set (S1; Yes), the control section 50 jumps to ordinary control routine (S3), and controls a current to be applied to shape memory alloy 23 through current supply circuit 52, based on an amount of lens barrel movement inputted from lens barrel movement amount input section 51. On the other hand, when the aging action completion flag is judged not to be set (S1; No), the control section 50 jumps to aging control routine (S2).

FIG. 17 is a diagram showing an aging control routine. First, control section 50 sets electricity-supply frequency i=0 as an initial setting (S21). Next, the control section 50 applies a prescribed amount of current (for example, 80 mA) to shape memory alloy 23 through current supply circuit 52 for a prescribed period of time (for example, 0.5 sec.) (S22). Next, the control section 50 stops applying current to the shape memory alloy 23 through current supply circuit 52 for a prescribed period of time (for example, 1.0 sec.) (S23). Next, the control section 50 increments electricity-supply frequency i by one (S24). Next, the control section 50 judges the electricity-supply frequency i whether it has arrived at a prescribed frequency or not (S25). When the electricity-supply frequency i is judged to have arrived at the prescribed frequency (S25; Yes), the control section 50 sets the aging action completion flag on memory section 501 (S26) to terminate the routine. When the electricity-supply frequency i is judged not to have arrived at the prescribed frequency (S25; No), the flow returns to S22, and steps S22-S25 are repeated until the electricity-supply frequency i arrives at the prescribed frequency.

Incidentally, the prescribed frequency may be set to the frequency at which a deformation amount is stabilized, and there is no upper limit for the prescribed frequency.

As stated above, by operating the aging treatment by repeating prescribed number of switching of electricity-supply between ON and OFF, an amount of deformation for applied current is stabilized as seen in FIG. 14. It enables, in the control thereafter, to provide accurate position control by setting an amount of current to be applied to the shape memory alloy based on an amount of lens barrel movement.

Incidentally, though heating and no-heating processes for the shape memory alloy were repeated by joule heat that is generated due to current applied to the shape memory alloy, it is also possible to externally repeat heating and no-heating processes.

Though the aging processing was applied to shape memory alloy 23 after completion of assembly of an image pickup apparatus unit, the aging processing for the shape memory alloy can be conducted by external heating process, for example, at any time before sheet member 23k is fixed on both edge portions, or before mounting on columnar section 22, or before pressing by helical compression spring 19. In particular, aging processing can be conducted either under the state where the shape memory alloy is stressed, or under the state where the shape memory alloy is not stressed.

In the aforesaid embodiment, the explanation was given referring to the example wherein the string-like shape memory alloy 23 is in contact with a bottom portion of lens frame 18 on the image pickup element 34 side between optical axis ○ of lens group 11 and cylindrical section 18p, to be extended, as shown in FIG. 5. However, the invention is not limited to this, and the following structure can also be employed.

FIG. 18 is a front view showing another example of arrangement of respective parts constituting a lens barrel inside an image pickup apparatus. FIG. 18 will be partially explained about only a portion which is different from the image pickup apparatus shown in FIG. 5.

In the image pickup apparatus shown in FIG. 18, two columnar sections 22 are formed to be standing on bottom plate 13, and they face each other with optical axis P in-between. Both end portions of shape memory alloy 23 formed to be in a string shape are interposed and fixed on columnar sections 22 by plate member 23k. Then, both end portions of the shape memory alloy 23 are connected to the flexible print board through the plate member 23k.

A central portion of the shape memory alloy 23 is arranged to be capable of touching a rear end portion of the second lens frame 18 on the image pickup element 34 side (image forming surface side). Therefore, the shape memory alloy 23 is extended under the condition that the central portion is arranged in the optical path of lens group 11.

Each of FIGS. 19(a) and 19(b) is a sectional view of the lens barrel inside the image pickup apparatus shown in FIG. 18 which is taken on a plane including the shape memory alloy. FIG. 19(a) is a diagram showing a situation wherein no electricity is supplied to shape memory alloy 23, and FIG. 19(b) is a diagram showing a situation wherein electricity is supplied to shape memory alloy 23, and lens group 11 is protruded.

As shown in FIG. 19(a), a protrusion section on the rear end of the second lens frame 18 is in contact with a receiving surface of bottom plate 13. As a result, when no-electricity is supplied to shape memory alloy 23, lens group 11 is stationary located at a certain position, and an image of a subject is formed on image pickup element 34. Therefore, if the focal position of the lens group 11 is adjusted at a hyperfocal distance, it is possible to take a photograph that is in focus for the distance covering from infinity to a half of a hyperfocal distance.

Under the aforesaid condition, if an electricity is applied to the shape memory alloy 23 through plate member 23k, the shape memory alloy 23 representing a resistor generates heat and its temperature rises, and its total length contracts to be shortened. Owing to this, the second lens frame 18 is guided by guide shafts 15 and 16 against pressing force of helical compression spring 19, to be moved to the subject side that is opposite to image pickup element 34, as shown in FIG. 19(b). Namely, lens group 11 that is held by the first lens frame 17 through the second lens frame 18 is moved to the subject side along optical axis ○. Therefore, it is possible to focus an image of a subject that is in a shorter distance onto image pickup element 34.

It is therefore recommended that no-electricity is supplied to shape memory alloy 23 in the case of long-range photographing and intermediate-range photographing, and that electricity is applied to shape memory alloy 23 in the case of close-range photographing such as photographing flowers.

Further, in the case where an image pickup apparatus has an AF function and where manual setting of distance for long-range and close-range is structured to be possible, electric power to be supplied to the shape memory alloy can be adjusted in many steps depending on a photographing distance.

Since the shape memory alloy 23 is arranged in the condition to cross optical axis ○ of lens group 11, and the second lens frame 18 is pressed uniformly, the second lens frame 18 can be moved in the optical axis direction efficiently. Incidentally, though an example wherein the shape memory alloy 23 is arranged in the condition to cross optical axis ○ of lens group 11 in the illustration, the shape memory alloy 23 can also be extended to avoid the optical axis.

Incidentally, the central portion of the shape memory alloy 23 mentioned above means a portion that is not an edge portion, and it does not mean the center position that is at equal distance from both ends.

Further, in the aforesaid structure, a central portion of the shape memory alloy 23 is arranged in the optical path of lens group 11. Therefore, a part of the optical path is interrupted by the shape memory alloy 23, and it becomes difficult to see an image, depending on conditions. A way of solving this problem will be explained based on FIGS. 20(a) and 20(b).

Each of FIGS. 20(a) and 20(b) is an illustration diagram wherein an optical path is interrupted by the shape memory alloy. FIG. 20(a) is a diagram wherein the shape memory alloy 23 is arranged in the optical path of lens group 11, and FIG. 20(b) is a diagram wherein the shape memory alloy 23 is viewed in the optical axis direction.

First, it is known that, if a size of a subject arranged in the optical axis of an image pickup lens is 3% or less of an area of the optical axis crossing the subject, an image of the subject is difficult to be observed even when the image is formed on an image pickup element.

When D represents a diameter of the optical path at a position where the shape memory alloy 23 is arranged in the optical path of lens group 11, and d represents a diameter of the shape memory alloy 23, as shown in FIG. 20(b), an area of the optical path is $\pi D^2/4$, and an area of the shape memory alloy 23 in the optical path is d·D. Therefore, the following conditional expression (1) is to be satisfied.

$$d \cdot D/(\pi D^2/4) < 0.03 \qquad (1)$$

This conditional expression (1) can be simplified as follows.

$$d/D < 0.02 \qquad (2)$$

Incidentally, for satisfying the conditional expression (2), it is preferable to arrange the shape memory alloy 23 at the position where an area of the optical path in the vicinity of a final surface of lens group 11 is large. However, if an arrangement is constituted so that an image of the shape memory alloy 23 formed on image pickup element 34 may be removed by an image processing, the conditional expression (2) does not always need to be satisfied.

According to circumstances, the shape memory alloy may either be arranged between lenses of an image pickup lens having plural lenses, or be arranged on the subject side of the image pickup lens.

Further, there is a possibility that a cell-phone housing therein an image pickup apparatus employing the shape memory alloy of this kind is used under the condition of high temperature. Therefore, it is preferable to make up the constitution wherein the shape memory alloy 23 is arranged to be loosened slightly so that the second lens frame 18 may not be advanced even if the shape memory alloy 23 shrinks at the temperature of 50-60° C. or the temperature lower than that, and the shape memory alloy 23 shrinks when the temperature becomes 100° C., for example, to touch rear end portion 18d and the second lens frame 18 may be advanced.

A lens barrel having the structure that is different from the foregoing will be explained as follows, referring to FIGS. 21, 22(a) and 22(b). FIG. 21 is a top surface diagram of a flat-head spring of a diaphragm type, and each of FIGS. 22(a) and 22(b) is a sectional view in which a shape memory alloy is extended. FIG. 22(a) is a diagram showing the situation where an electricity is not supplied to the shape memory alloy 23, while, FIG. 22(b) is a diagram showing the situation where electricity is applied to the shape memory alloy 23 and lens group 11 is protruded. The present lens barrel is similar to the aforesaid lens barrel on the point that the shape memory alloy 23 is extended with its central portion being arranged in the optical path of lens group 11, and both ends thereof are respectively fixed on columnar section 22. On the other hand, a different point is one wherein the second lens frame 18 has no engagement section 18d, guide shafts 15 and 16 are not provided to stand on bottom plate 13, and helical compression spring 19 is not provided.

First, leaf spring 25 of a diaphragm type shown in FIG. 21 is made of phosphor bronze or of stainless steel. Leaf spring 25 have steps in the direction of a center axis on flat portion 25a on the outer circumferential side and on flat portion 25c on the inner circumferential side, and flat portion 25a and to flat portion 25c is connected to each other with inclined portion 25b. Therefore, leaf spring 25 has a spring function due to deformation of the inclined portion 25b.

As shown in FIGS. 22(a) and 22(b), leaf spring 25 is fixed on the upper reverse side of cover member 12 and on the upper end portion of the second lens frame 18, and further, the same leaf spring 26 is fixed on protrusion section on the rear end of the second lens frame 18 and on bottom surface 13e of bottom plate 13. Spring pressure of leaf spring 25 is greater than that of leaf spring 26. Therefore, when no-electricity is supplied to the shape memory alloy 23, leaf spring 25 presses the second lens frame 18 against leaf spring 26 to cause a reverse side of leaf spring 26 to touch receiving surface 13b of bottom plate 13, thus, lens group 11 is positioned in the optical axis direction, as shown in FIG. 22(a). Further, when the shape memory alloy 23 is supplied for close-range photographing, the shape memory alloy 23 contracted, thereby, the second lens frame 18, namely, lens group 11 is protruded to the prescribed position against leaf spring 25.

Though the occasion of using leaf spring 25 of a diaphragm type is also the same as the occasion of using the aforesaid helical compression spring 19 in terms of basic function, the second lens frame 18, the first lens frame 17 and lens group 11 can be supported without tilting an optical axis, by using two leaf springs 25 and 26, and thereby, guide shafts 15 and 16 are made redundant, which makes a lens barrel to be smaller than that in the aforesaid structure.

Incidentally, in the aforesaid structure, the shape memory alloy 23 does not always need to cross optical axis O, but it is preferable to cross a location that is as close as possible to optical axis O.

The orientation for the shape memory alloy to move a lens group in the optical axis direction is not always limited to that toward the subject side, and it is also possible to constitute to move toward the image forming surface side according to circumstances. For example, a lens group is arranged so that it may be in the depth of field only for close-range, and the lens group is moved toward the image forming surface side when photographing for the long-range including infinity.

It is also possible to provide a structure so that a lens may be moved in the direction perpendicular to its optical axis for a lens movement for correction of shake of an image pickup apparatus and for a movement of a lens converter. Even in the case of the structure of this kind, a shape memory alloy is arranged in an optical path of a lens group. However, what is arranged in an optical path of a lens group is not always a central portion of the shape memory alloy, but a part of the shape memory alloy is arranged in the optical path of the lens group.

Incidentally, in the aforesaid explanation, there was used an example wherein the first lens frame 17 and the second lens frame 18 are provided. However, it is also possible to employ an example wherein the first lens frame 17 and the second lens frame 18 are integrated.

The invention claimed is:

1. A drive device comprising:
  a driven body;
  a shape memory alloy engaged with the driven body;
  a heating section for heating the shape memory alloy;
  a controlling section for controlling a drive of the driven body by controlling the heating section,
  wherein the controlling section applies an aging treatment to the shape memory alloy when the shape memory alloy is initially used, the aging treatment controlling the heating section to repeat a predetermined number or more of times of heating and no-heating processes.

2. The drive device of claim 1, wherein the heating section heats the shape memory alloy by applying an electric current to the shape memory alloy.

3. A drive device comprising:
  a driven body;
  a shape memory alloy engaged with the driven body;
  a heating section for heating the shape memory alloy;
  a controlling section for controlling a drive of the driven body by controlling the heating section,
  wherein the shape memory alloy is applied an aging treatment in advance, the aging treatment repeating a predetermined number or more of times of heating and no-heating processes.

4. The drive device of claim 3, wherein the shape memory alloy is heated by applying an electric current to the shape memory alloy.

5. A lens barrel comprising:
  a lens group for guiding light from a subject to an image pickup element;
  a lens frame supporting the lens group; and a shape memory alloy formed in a shape of a string for moving the lens frame in a predetermined direction, wherein a part of the shape memory alloy is arranged in an optical path of the lens group, and the shape memory alloy moves the lens frame by being contracted due to an electricity supplied to the shape memory alloy.

6. The lens barrel of claim 5, wherein the shape memory alloy moves the lens frame in a direction of an optical axis by being contracted.

7. The lens barrel of claim 6, wherein the shape memory alloy moves the lens frame close to the subject by being contracted.

8. The lens barrel of claim 7, wherein the lens frame is pressed toward the image pickup element.

9. An image pickup apparatus comprising the lens barrel of claim 5.

10. The drive device of claim 3, wherein the driven body comprises a lens group for guiding light from a subject to an image pickup element.

11. The drive device of claim 10, wherein the shape memory alloy moves the lens group in a direction of an optical axis of the lens group by being heated by the heating section.

12. An image pickup apparatus comprising:
an image pickup element; and
the drive device of claim 10.

13. An image pickup apparatus comprising:
an image pickup element; and
the drive device of claim 1, wherein the driven body of the drive device comprises a lens group for guiding light from a subject to the image pickup element.

* * * * *